United States Patent [19]

Kammler et al.

[11] Patent Number: 5,832,700

[45] Date of Patent: Nov. 10, 1998

[54] VERTICAL TUBULAR BAGGING MACHINE AND A METHOD FOR OPERATING A TUBULAR BAGGING MACHINE

[75] Inventors: Roman Kammler, Worms; Walter Baur, Gruendau, both of Germany

[73] Assignee: Rovema Verpackungsmaschinen GmbH, Fernwald, Germany

[21] Appl. No.: 890,915

[22] Filed: Jul. 10, 1997

[30] Foreign Application Priority Data

Jul. 12, 1996 [DE] Germany ................. 196 28 098.2

[51] Int. Cl.⁶ ............................................ B65B 1/32
[52] U.S. Cl. ........................ 53/502; 53/53; 53/451; 53/551
[58] Field of Search ................ 53/502, 451, 551, 53/493, 554, 555, 53, 58; 141/83, 194, 195

[56] References Cited

U.S. PATENT DOCUMENTS

| | | |
|---|---|---|
| 1,546,360 | 7/1925 | Bates ........................................ 53/451 |
| 3,707,172 | 12/1972 | Obara ........................................ 141/59 |
| 3,720,276 | 3/1973 | Banks ........................................ 177/122 |
| 4,074,507 | 2/1978 | Ruf ............................................. 53/502 |
| 4,090,344 | 5/1978 | Kelly ......................................... 53/451 |
| 4,117,647 | 10/1978 | Rossi ......................................... 53/502 |
| 4,235,067 | 11/1980 | Parsons ..................................... 53/502 |
| 4,300,600 | 11/1981 | Tetenborg ................................. 53/502 |
| 4,587,795 | 5/1986 | Yamashita ................................. 53/551 |
| 4,813,205 | 3/1989 | Mikata ....................................... 53/502 |

FOREIGN PATENT DOCUMENTS 1366-441-A 1/1988 U.S.S.R. ................................. 53/502

*Primary Examiner*—Daniel Moon
*Assistant Examiner*—James P. Calve
*Attorney, Agent, or Firm*—Flynn, Thiel, Boutell & Tanis, P.C.

[57] ABSTRACT

The lower end 11 of a foil tube 6 rests in a vertical tubular bagging machine 1 without any mechanical tension from the remainder of the foil tube 6 on a scale 17. The scale 17 weighs the end 11 together with dosed product portion of a flowable product, which portion is fed into the end 11. The measured value of the scale is delivered to a volumetric dosing device 20. The dosing device 20 changes the mass of the dosed product portion dependent on measured values of the scale 17. The invention improves the packaging speed and the dosing exactness, in particular for dosed masses of less than 5 kg. of flowable product, for example powders.

16 Claims, 1 Drawing Sheet

VERTICAL TUBULAR BAGGING MACHINE AND A METHOD FOR OPERATING A TUBULAR BAGGING MACHINE

FIELD OF THE INVENTION

The invention relates on the one hand to a vertical tubular bagging machine including a foil strip pulled off from a storage roller by means of a foil remover, a forming shoulder for forming the foil strip into a foil tube, a dosing device for inserting product, a fill pipe, a longitudinal sealing device, and cross-sealing jaws for welding the foil tube, which jaws are movable against one another, and a separating device for separating the foil tube. On the other hand, the invention relates to a method for operating such a tubular bagging machine.

BACKGROUND OF THE INVENTION

It is known to volumetrically dose a flowable product, for example a powder, by means of so-called worm scales, and to package the dosed product portion in a tubular bag. The dosing is done by a given rotation value of a dosing worm positioned in a worm pipe, in which a mass dependent on the density of the product is dispensed from the worm pipe during the given rotation. Also a volume dosing is known in which the content of a dosed volume corresponds with a product portion. Also the volume dosing is density dependent. Furthermore, gravimetric methods are known, in which a product portion is weighed and is then filled into a tubular bag.

The known dosing devices on tubular bagging machines have the disadvantage that they cannot exactly dispense small dosed masses with high precision. In a density dependent volumetric dosing device, density variations in the product influence the dosing result, in particular in the case of small dosed masses since in the case of a small dosed mass an instantaneous density increase or density reduction can only be balanced with little probability by an oppositely directed pendant. The dosing performance for small masses is particularly low in gravimetric dosing devices where a comparatively long fine dosing phase follows a relatively short rough dosing phase.

SUMMARY OF THE INVENTION

The basic purpose of the invention is to provide a vertical tubular bagging machine with a dosing device in such a manner and to find a suitable method so that also small dosing masses of flowable products can be exactly dispensed with high precision.

The invention is directed to a tubular bagging machine for forming a foil strip supplied from a storage roller into a foil tube. A forming shoulder forms the foil strip into a tube. A longitudinal sealing device secures the adjacent longitudinal edges of the foil tube together. Cross sealing jaws weld cross seams into the foil tube by pinching the foil tube therebetween and delineates individual foil bags. A dosing device inserts product through a fill pipe into individual foil bags. A separating device separates the individual filled bags from the foil tube.

According to the invention, a scale is provided below the lower end of the foil tube, which scale can be loaded by said end, whereby when the scale is loaded, the foil tube cannot apply any mechanical tension onto the end of the foil tube, and the scale is connected to a volumetric dosing device through a measured-value line. In a method according to the invention for operating a tubular bagging machine, the end of the foil tube rests without any mechanical tension on the scale, the scale then guides the measured value to the volumetric dosing device, and the dosing device changes the dosed mass dependent on the measured delivered values from the scale.

The tubular bagging machine of the invention and the method of the invention have the advantage that the product portions emitted by a volumetric dosing device can be exactly dispensed with high precision. Density fluctuations are registered by the scale in such a manner that the actual weight is compared with a desired value at a specific point in time during the dosing operation or after it has ended, for example in a computer or the like. The dosing device is directed to make a correction if the actual weight does not match the desired weight stored in the computer to a desired accuracy. The correction can be done by slightly extending or shortening the running time of the dosing operation. However, it can also occur only during the next product portion dosing operation. Due to the fact that the filled end of the foil tube rests without any force from the foil tube on the scale, the mass filled into the end can be precisely measured.

When the scale has a flap mechanism for receiving and removing the end of the foil tube, it is then possible with the flaps being closed to weigh the mass of the foil tube end segment on the flaps. When the flaps are open, it is possible after the top-side welding by the cross sealing jaws and separating of the tubular bag created from the foil tube end segment to eject the tubular bag downwardly out of the scale.

The scale can be elevationally adjusted when the dosed mass is changed by means of a mechanism for the elevational adjustment of the scale in order to correspond with a changed length of the foil tube end segment. A threaded spindle rotatably driven about an axis by a motor is suited for this purpose as a robust, reliable and locally precisely adjustable structural part of the mechanism.

When the dosing device has a worm conveyor extending into the fill pipe, it is possible to relatively accurately dose even a small dosed amount and the measured-value line can be connected directly to the motor of the worm conveyor by a control mechanism in order to achieve dosing corrections. An after-trickling of product from the worm conveyor is avoided when a closure is provided on the outlet of the worm conveyor. In particular, very easily flowable, powdery products have the tendency to trickle after stopping the worm conveyor. The closure is closed after the dosing operation has occurred and is again opened prior to the start of a new dosing operation.

A filled tubular bag, the mass of which deviates too much from the desired value, can be ejected by means of an ejecting device connected to the scale. The ejected bag is rejected and not shipped to consumers.

Since depending on the length of the tubular bag and the thickness of the foil, the end of the scale can be variably loaded. The dosed mass must be independent from the packaging (tare weight), thus the mass of the not filled foil tube end segment is subtracted when weighing the product portions. For this purpose, prior to the packaging of a changed product portion, the load of the scale with a not filled foil tube end segment is measured and stored as the tare weight. The stored value of the tare weight is then subtracted from all gross measured values, for example in an electronic control device.

In order not to influence the weighing, the foil tube should be transversely welded and separated only after a dosed mass has been weighed.

A particularly high performance increase is achieved with good precision for masses, which weigh at a maximum five kilograms.

BRIEF DESCRIPTION OF THE DRAWING

The invention will be described in greater detail hereinafter in connection with one figure illustrating one exemplary embodiment.

DETAILED DESCRIPTION

Figure 1:
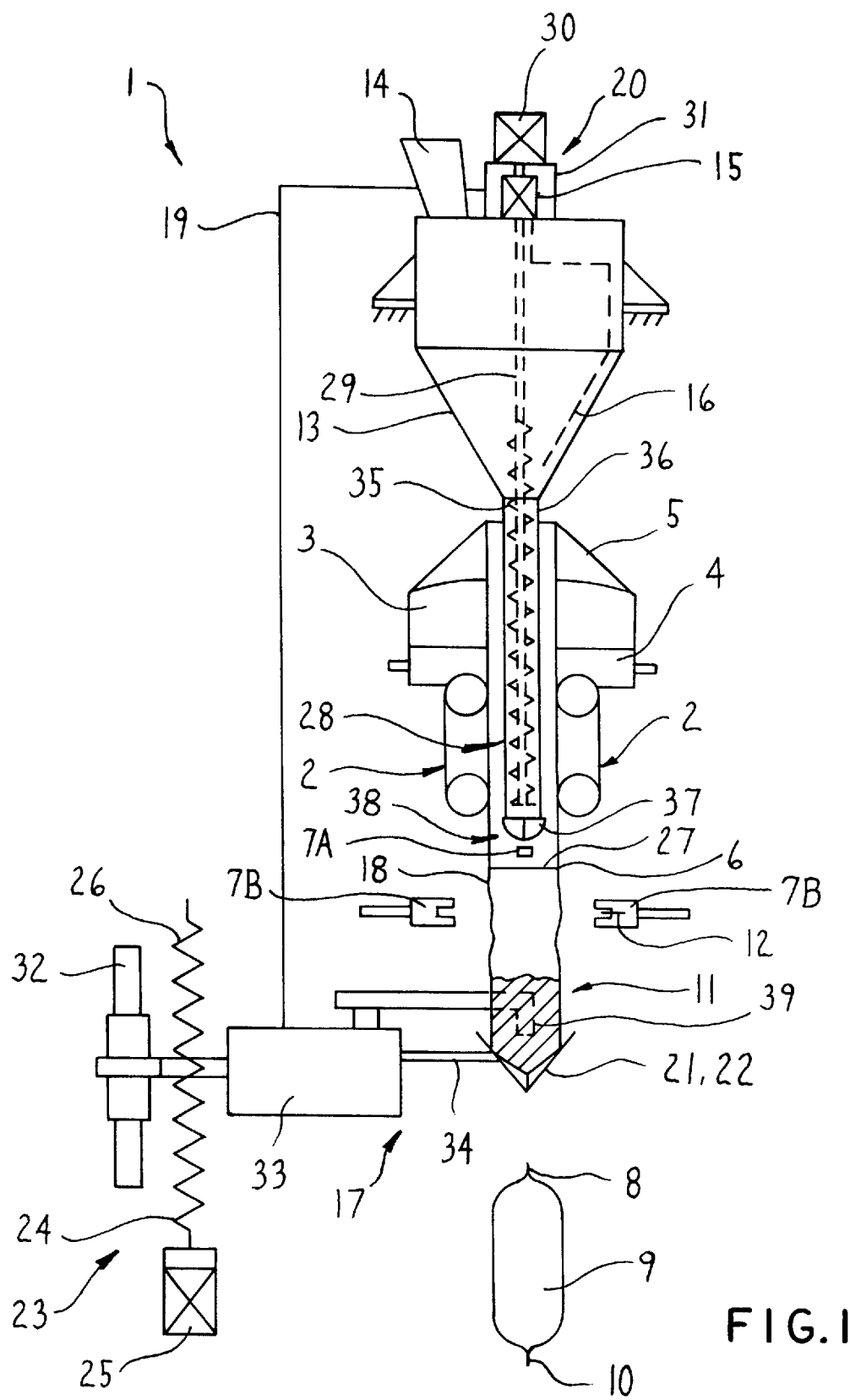
FIG. 1 is a side view of a principle illustration of a vertical tubular bagging machine with a volumetric dosing device, which by means of a worm conveyor inserted into the fill pipe delivers measured product which is to be packaged (not illustrated) from a product container into the lower welded end of a foil tube, whereby the foil tube end loads a flap mechanism of a scale, the foil tube end rests without any mechanical stress with respect to the remainder of the foil tube on the flap mechanism, and the scale is connected through a measured-value line to the dosing device.

A flat foil strip 3 in a vertical tubular bagging machine 1 is pulled from a storage roller 4 by means of a foil remover 2 and is shaped into a foil tube 6 by a forming shoulder 5. The foil tube 6 is welded lengthwise in a conventional manner by a longitudinal sealing device 7A and is, by means of cross-sealing jaws 7B movable against one another, transversely welded with respect to the foil-transporting direction. The cross-sealing jaws 7B create during a welding operation at the same time the top seam 8 of an already filled tubular bag 9 and the bottom seam 10 of the end segment 11 of the foil tube, whereby this bottom seam 10 is the bottom seam 10 of a next following tubular bag to be filled. The foil tube 6 is separated between a top seam 8 and a bottom seam 10 of the tubular bag directly following thereafter by a separating device 12.

A product container 13 is provided above the forming shoulder 5. The product container 13 is supplied with product through a fill connection 14. The product in the product container 13 may be a powder and is mixed by means of an agitator 16 driven by a motor 15. A scale 17 is provided below the lower end segment 11 of the foil tube 6 and is loaded by said end segment 11. The foil tube 6 forms slight waves 18 in the wall of the foil tube, since no mechanical tension exists between the upper area of the foil tube 6 and the end segment 11 of the foil tube 6. The foil remover 2 is operated accordingly.

The scale 17 is connected to a volumetric dosing device 20 through a measured-value line 19.

The scale 17 has a flap mechanism 22 as weighing plates 21 in order to receive and remove the end segment 11. Furthermore, the scale 17 has a mechanism 23 for the elevational adjustment of the scale 17. The mechanism 23 has a threaded spindle 26 rotatably driven about an axis 24 by a motor 25. The scale 17 is moved along a guide 32 through a defined angle of rotation of the threaded spindle 26 for a certain stretch with respect to its height, i.e. through a worm gear operation. Independent of its height, a pressure gauge 33 measures the weight of the end segment 11 transmitted by the load transmission device 34. The dosing device 20 has a worm conveyor or auger 28 extending in a fill pipe 27, a rigid connection 29 connected to a motor 30, and a control mechanism 31. The control mechanism 31 may be an electronic control device, for example a computer, integrated circuit, electrical circuit, mechanical control, or the like adapted to control operation of the worm conveyor in response to measured values received from the scale 17 through measured value line 19. The worm conveyor 28 consists of a conveyor worm 35 and a worm pipe 36 and can be closed off at its outlet 38 by means of a closure for the purpose of preventing a product after-trickling effect.

The scale 17 has an ejecting device 39 for ejecting an incorrectly filled tubular bag 9 out of the flap mechanism 22.

A not filled end 11 of the foil tube 6 is in a tubular bagging machine 1 initially moved at the start of a packaging series onto the flap mechanism 22. The scale 17 is for this purpose elevationally adjusted by operating the motor 25 such that the end of the foil tube 6 rests on the scale 17 without any mechanical tension, whereby the foil tube 6 forms waves 18 in the wall of the foil tube 16. The measured value from the scale 17 corresponds hereby relatively well with the tare weight of the tubular bag 9. The measured value is fed through the measured-value line 19 to the control mechanism 31 which stores the measured tare weight value. The conveyor worm 35 is thereafter rotated at an angle corresponding with the dosing mass by operating the motor 30, whereby this dosing mass, with the closure 37 being open, is fed from the worm pipe 36 and fill pipe 27 into the end segment 11 of the foil tube 6. The dosed mass is, for example, two kilograms. After the dosing operation has ended, the gross mass value of the filled end segment 11 is fed through the measured-value line 19 to the control mechanism 31.

The control mechanism 31 subtracts the measured gross mass value from the tare weight stored therein to determine a net mass value of the delivered product in end segment 11. The control mechanism 31 compares the net mass value with a stored desired product mass value. When the mass is correct, the foil tube 6 is transversely welded by the cross-sealing jaws 7, is separated by the separating device 12, and is removed downwardly by opening the flap mechanism 22.

When the mass is not correct, the control mechanism 31 of the dosing device 20 changes the dosed mass dependent on the delivered measured value. If the mass is too high, then the control mechanism 31 reduces the angle of rotation of the conveyor worm 35 for the next product portion. If the mass is too low, than the control mechanism 31 increases the angle of rotation of the conveyor worm for the next product portion. It is also foreseen that when the mass is too low, the control mechanism 31 may activate the worm conveyor 28 and deliver the mass of product which meets the desired mass value in the end segment 11. When a created, filled tubular bag 9 does not meet the tolerance requirements i.e. mass too high or too low, it is ejected horizontally out of the flap mechanism 22 by the ejecting device 39 with the flap mechanism 22 staying closed.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In a vertical tubular bagging machine, comprising a foil strip pulled off from a storage roller by means of a foil remover, a forming shoulder for forming the foil strip into a foil tube, a dosing device releasing product into the foil tube, a fill pipe, a longitudinal sealing device creating a longitudinal seam in the foil tube, cross-sealing jaws for welding across the foil tube creating bags, and a separating device for separating the foil tube into individual bags, the improvement comprising a scale being positioned below and receiving thereon an end of the foil tube, when the scale receives the end of the foil tube, a remaining portion of foil tube does not apply any mechanical stress to the end of the foil tube, the scale producing a measured value, a measured value signal-carrying line connecting the scale to the dosing device and providing the dosing device with the measured value from the scale, the scale having a flap mechanism movable between closed and open positions for respectively selectively receiving and removing the end of the foil tube on and from the scale, the flap mechanism being in the closed position to hold a product receiving end of the foil tube thereon, and the flap mechanism being in the open position to remove a properly filled one of the bags previously resting thereon during reception of product in the foil tube and after separating the bag from the foil tube by the separating device.

2. The tubular bagging machine according to claim 1, wherein the scale has a flap mechanism for selectively receiving and removing the end of the foil tube.

3. The tubular bagging machine according to claim 1, wherein a device for elevationally adjusting the scale corresponding to a change in length of the end of the foil tube forming the bag is provided.

4. The tubular bagging machine according to claim 3, wherein the device has a threaded spindle rotatably drivable about an axis by a motor.

5. The tubular bagging machine according to claim 1, wherein the dosing device has a worm conveyor extending into the fill pipe.

6. The tubular bagging machine according to claim 5, wherein an outlet of the worm conveyor has a closure for selectively opening and closing the outlet.

7. The tubular bagging machine according to claim 1, wherein an ejecting device connected to the scale is provided for ejecting tubular bags having an incorrect amount of delivered product from the closed flap mechanism in a rejection path separate from a correctly filled bag path.

8. A method for operating a tubular bagging machine, comprising the steps of: creating a foil tube, resting an end segment of the foil tube on a scale without any mechanical tension from a remaining foil tube segment, delivering product into the end segment of the foil tube from a volumetric dosing device, measuring the delivered product mass with a scale, transmitting the measured value to the volumetric dosing device, and changing the dosed mass delivered by the volumetric dosing device dependent on the transmitted measured value from the scale, the scale having a flap mechanism movable between closed and open positions for respectively selectively receiving and removing the end of the foil tube on and from the scale, the flap mechanism being in the closed position to hold a product receiving end of the foil tube thereon, and the flap mechanism being in the open position to remove a properly filled one of the bags previously resting thereon during reception of product in the foil tube and after separating the bag from the foil tube by the separating device.

9. The method according to claim 1, further comprising the steps of, prior to packaging a new product or delivering a new dosed mass, measuring a tare weight of a not filled end by the scale, and storing the measured tare weight.

10. The method according to claim 8, further comprising the steps of, after measuring a dosed mass, welding the foil tube transversely to create an individual foil bag and separating the individual foil bag from the foil tube.

11. The method according to claim 10, further comprising the steps of comparing the measured value to a desired value of product mass to determine if the dosed mass deviates too much from the desired value of the dosed mass, and if the measured value deviates too much, ejecting the tubular bag into a bag rejection path.

12. The method according to claim 8, further comprising the step of limiting the dosed mass to a maximum of five kilograms.

13. The method according to claim 10, further comprising the steps of supporting the individual foil bag on a flap mechanism of the scale, dropping the individual foil bag having therein a select amount of product through an opened flap mechanism, and ejecting the individual foil bag having an incorrect amount of product therein sidewardly off a closed flap mechanism.

14. The method according to claim 11, wherein if the measured value is the desired value, dropping the bag through a flap mechanism of the scale.

15. The method according to claim 11, further comprising the step of altering the angular rotation of the worm conveyor to achieve the desired accuracy in delivering product into the foil tube.

16. A bagging machine, comprising: means for creating a bag from a foil tube, the foil tube extending in a vertical direction and having a bag being formed at a lower end thereof and having an above-bag portion; means for filling the bag with a set amount of product; a flap mechanism receiving the bag thereon and supporting the bag such that the above-bag portion of the foil tube is not stressing the bag, the flap mechanism being movable between open and closed positions; a scale being connected to the flap mechanism and measuring the weight of the bag and product received in the bag, the scale producing a weight measurement value of the bag and product; a measured value signal transmitting line connecting the scale and the means for filling, said line transmitting the weight measurement value from the scale to the means for filling; and the flap mechanism being in the open position to drop the bag therefrom when the bag has a select weight measured by the scales, the flap mechanism being in the closed position to support the bag thereon.

* * * * *